(12) United States Patent
Stuhr et al.

(10) Patent No.: US 7,726,829 B2
(45) Date of Patent: Jun. 1, 2010

(54) LIGHTED BACKGROUND FOR FISH TANKS AND THE LIKE

(76) Inventors: Darlene K. Stuhr, N3201 Crazy Horse La., #45, Brodhead, WI (US) 53520; Donald E. Stuhr, N3201 Crazy Horse La., #45, Brodhead, WI (US) 53520

( * ) Notice: Subject to any disclaimer, the term of this patent is extended or adjusted under 35 U.S.C. 154(b) by 29 days.

(21) Appl. No.: 12/059,561

(22) Filed: Mar. 31, 2008

(65) Prior Publication Data
US 2009/0086467 A1 Apr. 2, 2009

Related U.S. Application Data

(60) Provisional application No. 60/920,704, filed on Mar. 30, 2007.

(51) Int. Cl.
*F21V 33/00* (2006.01)
(52) U.S. Cl. ........................ 362/101; 362/806; 362/267
(58) Field of Classification Search ................. 362/101, 362/267, 806; 40/549, 555, 579, 580
See application file for complete search history.

(56) References Cited

U.S. PATENT DOCUMENTS

| | | | |
|---|---|---|---|
| 3,742,835 A | 7/1973 | Bahnsen | |
| 3,921,189 A | 11/1975 | Gallistel | |
| 3,999,179 A | 12/1976 | Prame | |
| 4,034,494 A | 7/1977 | Lane | |
| 4,218,122 A | 8/1980 | Drafahl, Jr. | |
| 4,279,771 A | 7/1981 | Shionozaki et al. | |
| 4,506,916 A | 3/1985 | Kuhl | |
| 4,564,409 A | 1/1986 | Kuhl | |
| 4,597,035 A | 6/1986 | Lettenmeyer | |
| 4,805,679 A | 2/1989 | Czinner | |
| 4,845,405 A | 7/1989 | Yamane et al. | |
| 4,998,162 A | 3/1991 | Kondo et al. | |
| 5,159,648 A | 10/1992 | Ogura et al. | |
| 5,265,357 A | 11/1993 | Yu | |
| 5,265,360 A * | 11/1993 | Reiss et al. | 40/427 |
| 5,649,757 A | 7/1997 | Aleman et al. | |
| 5,749,320 A | 5/1998 | Sydenstricker | |
| 6,072,449 A | 6/2000 | Amemiya | |
| 6,204,899 B1 | 3/2001 | Hall | |
| 6,332,430 B1 * | 12/2001 | Santa Cruz et al. | 119/256 |
| 6,351,904 B1 | 3/2002 | Hermanson | |
| 6,480,681 B1 | 11/2002 | Neil | |
| 6,651,586 B2 * | 11/2003 | Horth et al. | 119/246 |
| 6,742,477 B1 * | 6/2004 | Marraudino | 119/256 |
| 6,774,874 B2 | 8/2004 | Naka et al. | |
| 7,162,821 B2 * | 1/2007 | Venkataraman et al. | 40/541 |
| 2009/0147502 A1 * | 6/2009 | Aleman | 362/101 |

* cited by examiner

*Primary Examiner*—Anabel M Ton
(74) *Attorney, Agent, or Firm*—Craig A. Fieschko, Esq.; DeWitt Ross & Stevens S.C.

(57) ABSTRACT

A lighted background for mounting on a wall of an aquarium fish tank or the like includes a front panel having an image formed thereon. Light apertures are formed through the front panel and lighting is provided behind the panel to direct light through the apertures. Translucent material covering the apertures and reflective material behind the lights enhances the lighting effect.

20 Claims, 2 Drawing Sheets

LIGHTED BACKGROUND FOR FISH TANKS AND THE LIKE

This application claims the benefit of U.S. Provisional Application No. 60/920,704, filed Mar. 30, 2007, which is incorporated herein by reference in its entirety.

FIELD OF THE INVENTION

This invention pertains generally to accessories for fish tank aquariums and other similar display containers, and the like, and, more particularly, to a lighted background that may be mounted on the back of such a display container and visible therethrough.

BACKGROUND OF THE INVENTION

Various accessories currently are available to enhance the appearance of fish tank aquarium displays. These accessories include various objects (such as real and artificial plants, coral, rocks and stones of various colors, shapes, and sizes, and statuary of various types) that are placed in the aquarium tank along with the water and fish. Other accessories are available to provide background and lighting effects for an aquarium. For example, in many cases a lighting fixture is mounted on top of the aquarium to direct light downward into the water to illuminate the fish and other objects in the tank.

Background displays for aquarium fish tanks generally provide a two dimensional image that can be seen at the back of the aquarium by a viewer looking into the front of the aquarium in the normal manner. Such background displays typically are provided as an image formed on a flat sheet of material that is mounted on the outside of the back glass panel or wall of the aquarium, with the image side of the sheet material up against the aquarium glass. The background image may be formed, for example, on a sheet of plastic material that may be attached to the aquarium wall in a variety of ways.

An exemplary background device of this type is described in U.S. Pat. No. 5,749,320 to Sydenstricker. This patent describes an aquarium background device that includes at least one thin sheet of plastic material having a scene or picture thereon. The background device is adapted to be used in conjunction with a clear liquid, such as water or clear petroleum jelly, that is used between the plastic sheet and the outer rear surface of the rear glass of the aquarium to adhere the device to the outside surface of the rear glass wall of the aquarium in a manner that insures that the images and colors thereof will be vividly seen from the front of the aquarium and that the device can be easily removed and replaced with different background devices when desired. The preferred background device described includes at least a portion thereof that is translucent to allow lighting from the rear. Another portion of the background device might be opaque to prevent the transmission of light therethrough. Images on plastic insert sheets or on additional plastic sheet background devices may be layered together to produce different background effects. For example, such insert sheets or additional background devices may be positioned behind a background device attached directly to the aquarium glass so as to be visible through transparent areas of the background device that is attached directly to the aquarium glass. Although this patent suggests that a background display may be lighted from the rear, it does not describe or suggest any such lighting in particular.

An exemplary apparatus for illuminating a decorative scene disposed adjacent to a wall of an aquarium, terrarium, or other such enclosure is described in U.S. Pat. No. 5,649,757 to Aleman et al. In a preferred embodiment, this invention comprises a housing defining a cavity having an inner surface, an outer surface, an upper and lower edge, and a top portion, wherein at least a portion of the inner surface is a reflective surface and is inclined relative to the wall of the enclosure. The inclined inner surface includes means for reflecting light incident on at least a part thereof. A light source positioned external to the cavity projects light onto the reflective surface within the reflective chamber, which light in turn is reflected off of the reflective surface onto the back of the decorative scene disposed adjacent to the wall of the enclosure. It is an important aspect of this invention to illuminate uniformly the decorative background over the entire surface thereof without causing point sources of light behind the decorative scene which would detract from providing an illuminated background which appears natural and not artificial. Thus, diffusing means may also be used to diffuse or scatter light within the reflective chamber so as to more uniformly direct light rays toward the wall of the enclosure. This patent, therefore, describes a device for providing general illumination over the entire image surface of a background scene image from the rear thereof.

What is desired, however, is a new and improved background display for fish tank aquariums and the like wherein the background display itself is lighted in manner to provide a striking visual background with bright lighted areas integrated into the background image.

SUMMARY OF THE INVENTION

The present invention provides a lighted background for fish tank aquariums and the like. In accordance with the present invention, a light source is integrated with a background image to provide lighting through specific areas of the background image in a manner that provides a striking visual effect.

A lighted background in accordance with the present invention includes an opaque front panel having a decorative image formed on a front side thereof. Apertures are formed through the front panel at appropriate places thereon corresponding to areas of the decorative image through which light is to be emitted.

On the back side of the front panel, translucent material, which may be of various colors, is positioned over the aperture openings. A light source is provided behind the back side of the front panel to project light through each of the aperture openings via the translucent material. Preferably a separate light source, such a lamp, is provided behind each aperture to provide such lighting. For example, a string of such lights may be provided attached to the back side of the front panel, with one or more lights in the string positioned behind the translucent material mounted over each aperture opening. A reflective material, such as a reflective foil, may be attached to the back side of the front panel over the light and translucent material, to improve further the direction of light through the apertures.

A back panel may be provided to cover the back side of the front panel and the various elements mounted thereon.

One or more mounting structures, e.g., hooks or clips, may be provided to facilitate attaching a lighted background in accordance with the present invention to a wall of an aquarium fish tank or other similar display container or structure.

In use, a lighted background in accordance with the present invention is mounted on or adjacent to a transparent wall of an aquarium or other similar structure such that the front side of the front panel of the background containing the decorative image is adjacent to the transparent wall. When the lights in the lighted background are turned on, light is directed through the apertures in the front panel to create a striking visual effect.

Further objects, features, and advantages of the present invention will appear more fully from the following detailed description of the preferred embodiment of the invention made in conjunction with the accompanying drawings.

DETAILED DESCRIPTION OF THE INVENTION

Figure 1:
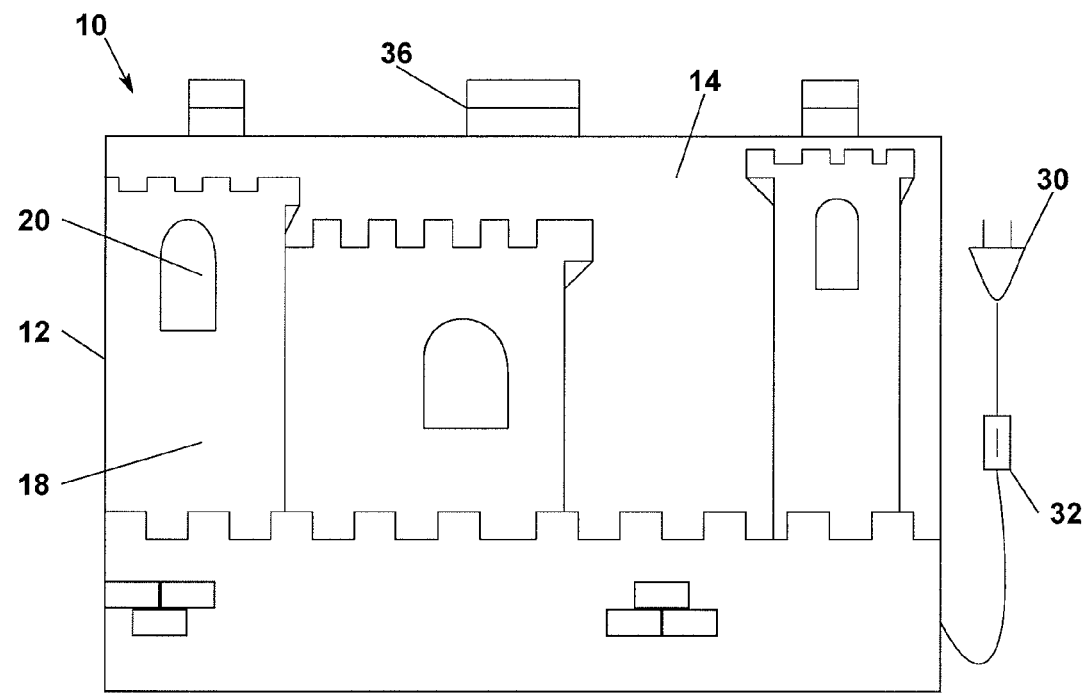
FIG. 1 is a front view of an exemplary lighted background in accordance with the present invention.
Figure 2:
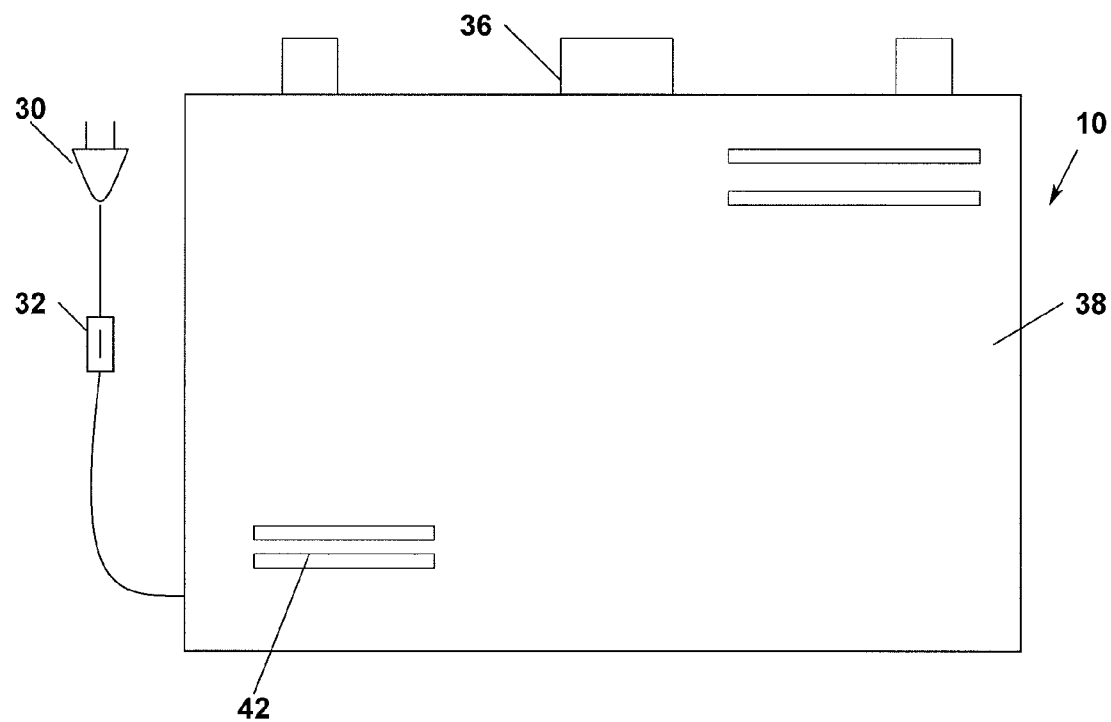
FIG. 2 is a back view of the exemplary lighted background in accordance with the present invention of FIG. 1.
Figure 3:
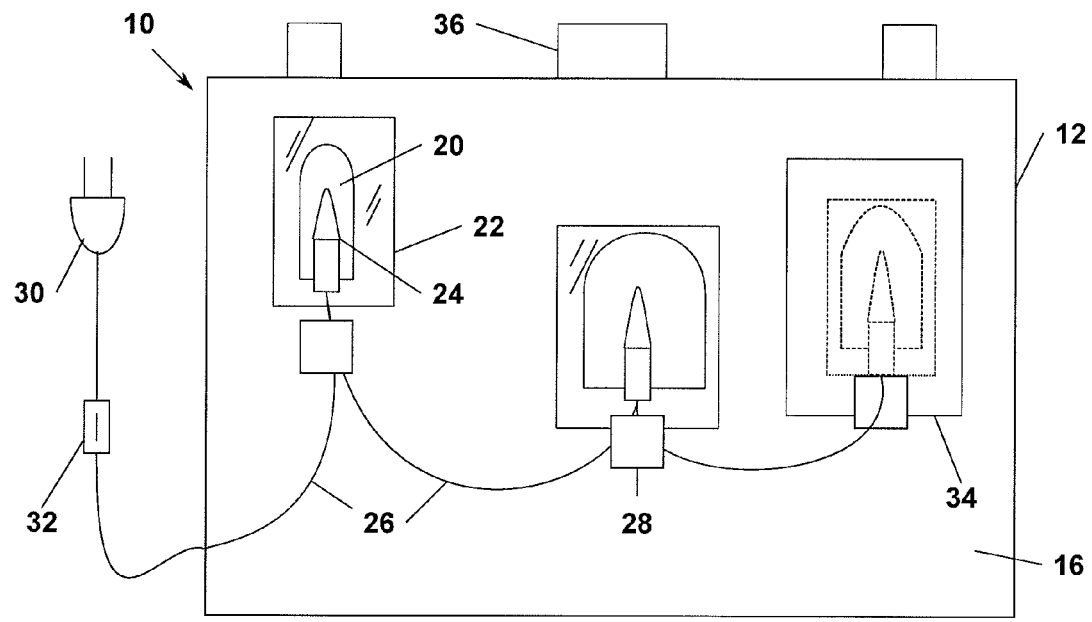
FIG. 3 is a back view of the exemplary lighted background in accordance with the present invention of FIG. 1 with a back panel thereof removed to show a back side of a front panel thereof.

The present invention will now be described in detail with reference to an exemplary lighted background 10 in accordance with the present invention, as illustrated in FIGS. 1-4. It should be noted that the various components of the exemplary embodiment of the invention as illustrated in the drawing figures are not necessarily drawn to scale, but are presented therein for ease of illustration and understanding. It should also be noted that the present invention is described herein with reference to the use thereof as an accessory for a fish tank aquarium. However, it should be understood that a lighted background in accordance with the present invention may be used in combination with similar structures, such as glass or plastic aquariums, terrariums, and other display containers of this type having transparent walls for viewing the contents thereof.

A lighted background 10 in accordance with the present invention includes a front panel 12. The front panel 12 may be made of any appropriate material, such as plastic, heavy coated paper or cardboard, wood or hardboard, or the like. The front panel 12 may preferably be made to any appropriate thickness, depending on the material used, and may be sized in the other dimensions to correspond generally to the size of a wall of an aquarium or other display container with which it is to be used.

The front panel 12 has a front side 14 and a back side 16. A decorative image 18 is formed on the front side 14 of the front panel 12. The decorative image 18 may be any desired image or scene (e.g., a castle, Atlantis, pirate ships, etc.) and may be formed on the front side 14 of the front panel 12 in any appropriate manner, e.g., using any appropriate printing, lithographic, photographic reproduction, or other method. The decorative image 18 may be felted and painted on the front side 14 of the front panel 12.

A plurality of light apertures 20 are formed through the front panel 12 at various locations thereon. Preferably, the light apertures 20 are formed in the front panel 12 so as to correspond to appropriate areas of the decorative image 18 formed on the front panel 12. The light apertures 20 thus may be formed to have any desired size and shape as may be appropriate. For example, in the example illustrated in FIG. 1, an undersea castle image 18 is provided on the front side 14 of the front panel 12. In this case, several light apertures 20 are formed through the front panel 12 at various locations, and have an appropriate size and shape, to represent castle windows. The light apertures 20 may be formed through the front panel 12 in any desired manner, e.g., by punching, die cutting, or cutting automatically or manually using a saw or knife. Alternatively, the light apertures 20 may be integrally formed along with the front panel 12.

Translucent covering material 22 is mounted on the back side 16 of the front panel 12 so as to cover each light aperture 20. The translucent covering material 22 may be of any desired color or degree of clarity (e.g., yellow or clear) and may have images or other decorations formed thereon. The translucent covering material 22 may be made of any appropriate translucent material and may be attached to the back side 16 of the front panel 12 over the window apertures 20 in any desired manner. For example, the covering material 22 may be formed from translucent rigid or flexible plastic sheets that are attached to the back side 16 of the front panel 12 using adhesive tape or glue.

In accordance with the present invention, a light source 24 is provided behind the back side 16 of the front panel 12 to direct light through the light apertures 20, via the translucent covering material 22. Preferably at least one individual light source 24 is provided for each light aperture 20. The light source 24 may be implemented in any appropriate manner. For example, low voltage lamps, such as are conventionally used for holiday lighting, light emitting diodes (LEDs), or fiber optic directed light sources, may be used to implement the light source 24. The light source 24 may itself provide white or colored light, as desired.

The light source 24 preferably may be provided in a string 26 of lights. The lights 24 preferably are connected together in the string 26 in parallel in a conventional manner, so that the failure of one light 24 in the string 26 will not affect operation of the other lights 24 in the string 26.

One or more individual lights 24 are positioned adjacent to each light aperture 20, behind the translucent covering material 22, by attaching the light 24 or string 26 to the back side 16 of the front panel 12 at appropriate locations in an appropriate manner. For example, clips mounted to the back side 16 of the front panel, adhesive tape, or any other desired attaching structure 28 or method may be used for this purpose.

The light source 24 may be battery powered, but preferably is provided power in a conventional manner via a conventional electrical power outlet. Thus, a conventional plug 30 may be provided on the end of the light string 26 for this purpose. The plug 30 may be of the conventional two prong (polarized or not polarized) or three prong variety. Sufficient electrical cord should be provided (not shown to scale in the figures).

A switch 32 preferably is provided to allow the lights 24 to be turned on and off. For example, a conventional thumb operated wheel switch 32 or other switch may be mounted on the light string 26 between the plug 30 and the lights 24 for this purpose. It should be understood that any other appropriate switch 32 may be used for this purpose and provided in any desired appropriate location, such as mounted on the lighted background 10 itself. Alternatively, no switch 32 need be provided, in which case the lights 24 may be turned on and off by plugging and unplugging the plug 30 from an outlet, or by switching the power provided to the outlet.

A reflective material 34 preferably is attached to the back side 16 of the front panel 12 over both the light 24 and translucent cover 22 associated with each light aperture 20. This reflective material 34 may be provided as sheets of aluminum foil, or some similar material, that are attached to the back side 16 of the front panel 12 in the appropriate locations thereon in any conventional appropriate manner, such as using adhesive tape or an appropriate glue. The use of the reflective material 34 in this manner enhances the direction of light from the light source 24 through the translucent material 22 and out of the light apertures 20.

An appropriate mounting structure 36 may be provided to attach the lighted background 10 in accordance with the present invention to a wall of an aquarium or similar structure. For example, one or more hook like mounting structures 36 may be provided at a top edge of the front panel 12, extending forward therefrom, for this purpose. Such mounting structures 36 may be attached to the front panel 12 in any conventional manner, using any desired fasteners, for example, or integrally formed with the front panel 12.

A back panel 38 may be attached at the back side 16 of the front panel 12 to cover the various elements mounted to the back side 16 of the front panel 12. The back panel 38 may be made of any desired material, such as plastic, and may be attached to the front panel 12 in any desired manner. For example, the front panel 12 and back panel 38 may be designed to snap together or to be attached together using fasteners, such as screws. The front 12 and back 38 panels may be designed such that, when joined together, they form a cavity between the panels that is defined by both the front 12 and back 38 panels and side 40 (see FIG. 4) and top and bottom (not shown) walls that may be formed as part of the front panel 12, as part of the back panel 38, or as separate elements attached to either panel 12 or 38 in any appropriate manner. Preferably the total thickness of a lighted background 10 in accordance with the present invention is such that it may be positioned against a back wall of an aquarium without interfering with the positioning of pump or other equipment also mounted on the back wall of the aquarium. If necessary, a portion of the lighted background housing formed by the front 12 and back 38 panels may be made tapered or otherwise shaped or formed to accommodate the positioning of such equipment on the wall of an aquarium along with the lighted background 10. Appropriate venting 42 preferably may be provided in the back panel 38 as needed.

Figure 4:
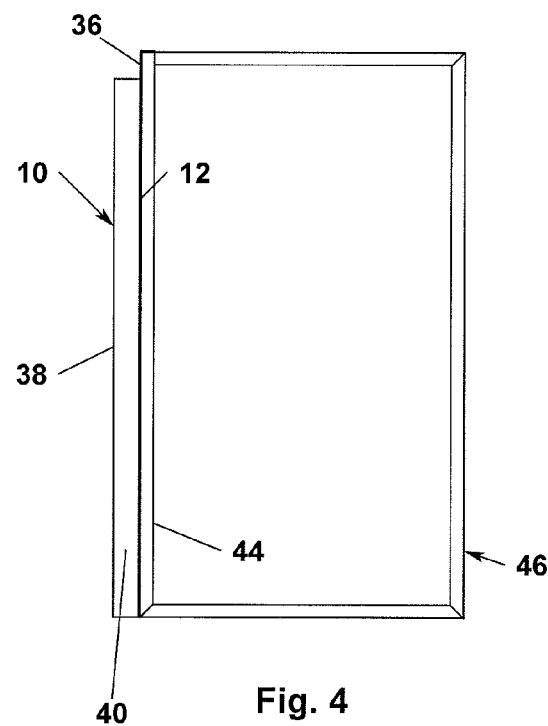
FIG. 4 is a side view of the exemplary lighted background in accordance with the present invention of FIG. 1 shown mounted on a fish tank aquarium.

In use, a lighted background 10 in accordance with the present invention may be mounted on or adjacent to a transparent wall 44 of an aquarium 46 or other similar display container. The lighted background 10 is so mounted such that the image 18 on the front panel 12 is adjacent to the transparent wall 44. For example, as illustrated in FIG. 4, the lighted background may be mounted to the back wall 44 of an aquarium 46 in this manner may hooking the mounting structures 36 provided over a top edge of the wall 44.

Once mounted to an aquarium 46 or other structure, power may be provided, e.g., by plugging the plug 30 into an available outlet. The switch 32 may then be actuated to turn on the lights 24. The result is a striking lighted background image visible through the wall 44 of the aquarium 46.

It is understood that the invention is not confined to the particular construction and arrangement of parts herein illustrated and described, but embraces such modified forms thereof as come within the scope of the following claims.

What is claimed is:

1. A lighted background for a display container having at least one transparent wall, including:
   (a) a front panel having a front side and a back side;
   (b) an image formed on the front side of the front panel;
   (c) at least one light aperture formed on the front panel, through the front side and the back side, and wherein a location of the at least one light aperture corresponds to at least one selected area of the image;
   (d) a translucent material attached to the back side of the front panel and covering the light aperture; and
   (e) a light source at the back side of the front panel and behind the translucent material for directing light through the translucent material and the light aperture,
   wherein:
   (1) the display container includes a fish tank aquarium having at least one transparent wall, and
   (2) the lighted background is mounted on the at least one transparent wall of the aquarium such that the image on the front side of the front panel is adjacent to the at least one transparent wall.

2. The lighted background of claim 1 further including a plurality of light apertures and wherein each light aperture displays a corresponding light source.

3. The lighted background of claim 2 further including a reflective material mounted to the back side of the front panel, covering the translucent material and the light source.

4. The lighted background of claim 3 wherein the reflective material includes reflective foil.

5. The lighted background of claim 1 further including a mounting structure for mounting the lighted background to the display container.

6. A lighted background for a display container having a transparent wall, including:
   (a) a front panel having a front side and a back side;
   (b) an image formed on the front side of the front panel;
   (c) a plurality of light apertures formed on the front panel, through the front side and the back side at locations thereon corresponding to selected areas of the image;
   (d) a translucent material attached to the back side of the front panel and covering each of the light apertures; and
   (e) at least one individual light source for each light aperture, located at the back side of the front panel and behind the translucent material for directing light through the translucent material and each light aperture
   wherein:
   (1) the display container includes a fish tank aquarium having at least one transparent wall, and
   (2) the lighted background is mounted on the at least one transparent wall of the aquarium such that the image on the front side of the front panel is adjacent to the at least one transparent wall.

7. The lighted background of claim 6 wherein the individual light sources are connected together in a string of light sources, and wherein the string of light sources is located at the back side of the front panel.

8. The lighted background of claim 6 further including a reflective material mounted to the back side of the front panel, covering the translucent material and each light source.

9. The lighted background of claim 8 wherein the reflective material includes reflective foil.

10. The lighted background of claim 6 further including a mounting structure for mounting the lighted background to the display container.

11. An aquarium having a lighted background, including:
    (a) an aquarium having at least one transparent wall; and
    (b) a lighted background mounted to the at least one transparent wall of the aquarium, the lighted background including:
    (1) a front panel having a front side positioned adjacent to the at least one transparent wall of the aquarium and a back side;
    (2) an image formed on the front side of the front panel;
    (3) at least one light aperture formed through the front panel, through the front side and the back side, and wherein the at least one light aperture corresponds to at least one selected area of the image;

(4) a translucent material attached to the back side of the front panel and covering the light aperture; and (5) a light source at the back side of the front panel and behind the translucent material for directing light through the translucent material and the light aperture.

12. The aquarium of claim 11 further including a plurality of light apertures and wherein each light aperture displays a corresponding light source.

13. The aquarium of claim 12 further including a reflective material mounted to the back side of the front panel, covering the translucent material and each light source.

14. The lighted background of claim 1, further including a back panel attached at the back side of the front panel, wherein the back panel covers the at least one light aperture, the translucent material, and a light source.

15. The lighted background of claim 14, wherein the back panel further defines a cavity between the back panel and the back side of the front panel.

16. The lighted background of claim 6, further including a back panel attached at the back side of the front panel, wherein the back panel covers the plurality of light apertures, the translucent material covering each of the light apertures, and the at least one individual light source for each aperture.

17. The lighted background of claim 16, wherein the back panel further defines a cavity between the back panel and the back side of the front panel.

18. The aquarium of claim 11, further including a back panel attached at the back side of the front panel, wherein the back panel covers the at least one light aperture, the translucent material, and the light source.

19. The aquarium of claim 18, wherein the back panel further defines a cavity between the back panel and the back side of the front panel.

20. The aquarium of claim 11 wherein the front panel includes reflective foil thereon.

* * * * *